(12) United States Patent
Shi et al.

(10) Patent No.: US 11,578,274 B2
(45) Date of Patent: Feb. 14, 2023

(54) MULTI-STAGE FLUIDIZED CATALYTIC REACTION PROCESS OF PETROLEUM HYDROCARBONS AND AN APPARATUS THEREOF

(71) Applicant: QINGDAO JINGRUN PETROCHEMICAL DESIGN INSTITUTE CO., LTD., Qingdao (CN)

(72) Inventors: Baozhen Shi, Qingdao (CN); Lin Shi, Qingdao (CN)

(73) Assignee: QINGDAO JINGRUN PETROCHEMICAL DESIGN INSTITUTE CO., LTD., Qingdao (CN)

( * ) Notice: Subject to any disclaimer, the term of this patent is extended or adjusted under 35 U.S.C. 154(b) by 40 days.

(21) Appl. No.: 17/059,173

(22) PCT Filed: Apr. 30, 2019

(86) PCT No.: PCT/CN2019/085278
§ 371 (c)(1),
(2) Date: Nov. 25, 2020

(87) PCT Pub. No.: WO2019/228130
PCT Pub. Date: Dec. 5, 2019

(65) Prior Publication Data
US 2021/0214623 A1    Jul. 15, 2021

(30) Foreign Application Priority Data

May 29, 2018    (CN) .......................... 201810534828.3

(51) Int. Cl.
*C10G 51/02*    (2006.01)
*B01J 8/00*    (2006.01)
(Continued)

(52) U.S. Cl.
CPC ............ *C10G 51/026* (2013.01); *B01J 8/005* (2013.01); *B01J 8/0015* (2013.01); *B01J 8/1827* (2013.01);
(Continued)

(58) Field of Classification Search
CPC ............ C10G 51/026; C10G 2300/202; C10G 2300/308; C10G 2300/4006;
(Continued)

(56) References Cited

U.S. PATENT DOCUMENTS 9,573,865 B2    2/2017 Bhuyan et al.
2018/0050969 A1*    2/2018 Bhuyan ................ C10G 11/187

FOREIGN PATENT DOCUMENTS

| CN | 1760342 A | 4/2006 |
| CN | 102399579 A | 4/2012 |

(Continued)

OTHER PUBLICATIONS

PCT Patent Application Serial No. PCT/CN2019/085278, English translation of International Search Report dated Aug. 5, 2019, 2 pages.

(Continued)

*Primary Examiner* — Randy Boyer
*Assistant Examiner* — Juan C Valencia
(74) *Attorney, Agent, or Firm* — Hoffman Warnick LLC (57) ABSTRACT

A petroleum hydrocarbon multi-stage fluid catalytic reaction method and reactor are described. The method implements a sectional multi-stage reaction in one reactor and comprises primary-stage and secondary-stage catalytic cracking reactions of feedstock oil and primary-stage and secondary-stage catalytic cracking reactions of light hydrocarbons and/or cycle oil, which occur in different reaction regions of the reactor. The primary-stage reaction of the light hydrocarbon and/or circulation oil is carried out in an independent (Continued)

reaction region. The reactor comprises a first reaction section, a catalyst splitter, a third reaction section, a second reaction section and a settler.

16 Claims, 7 Drawing Sheets

(51) Int. Cl.
    *B01J 8/18*     (2006.01)
    *B01J 8/28*     (2006.01)

(52) U.S. Cl.
    CPC .............. *B01J 8/1863* (2013.01); *B01J 8/28* (2013.01); *B01J 2208/00769* (2013.01); *B01J 2208/00938* (2013.01); *C10G 2300/202* (2013.01); *C10G 2300/308* (2013.01); *C10G 2300/4006* (2013.01); *C10G 2300/4018* (2013.01); *C10G 2300/4093* (2013.01)

(58) Field of Classification Search
    CPC .... C10G 2300/4018; C10G 2300/4093; C10G 11/18; C10G 51/00; C10G 51/02; C10G 11/182; C10G 11/187; B01J 8/0015; B01J 8/005; B01J 8/1827; B01J 8/1863; B01J 8/28; B01J 2208/00769; B01J 2208/00938; B01J 8/125
    See application file for complete search history.

(56)     References Cited

FOREIGN PATENT DOCUMENTS

| | | |
|---|---|---|
| CN | 102465006 A | 5/2012 |
| CN | 102485841 A | 6/2012 |
| CN | 102746880 A | 10/2012 |
| CN | 1912067 A | 2/2017 |
| CN | 1912068 A | 2/2017 |
| CN | 107286972 A | 10/2017 |

OTHER PUBLICATIONS

Chinese Patent Application Serial No. 201810534828.3, Search Report and English translation, 3 pages.
Chinese Patent Application Serial No. 201810534828.3, Office Action dated Jan. 21, 2020 and English translation, 7 pages.

\* cited by examiner

MULTI-STAGE FLUIDIZED CATALYTIC REACTION PROCESS OF PETROLEUM HYDROCARBONS AND AN APPARATUS THEREOF

CROSS-REFERENCE TO RELATED APPLICATIONS

This application is a National Stage of International Application No. PCT/CN2019/085278, filed on Apr. 30, 2019, which claims priority to Chinese Patent Application No. 201810534828.3, filed on May 29, 2018, all of which are hereby incorporated by reference in their entireties.

TECHNICAL FIELD

The present invention relates to the technical field of petroleum hydrocarbon catalytic conversion, in particular to a multi-stage fluidized catalytic reaction process of petroleum hydrocarbons and an apparatus thereof, which would produce more propylene.

BACKGROUND OF THE INVENTION

Catalytic cracking reactor is the main apparatus to produce gasoil, which is also the important apparatus to produce propylene. Propylene is one of the most important petrochemical materials. Reference to the operation and design of the conventional catalytic cracking reaction-regeneration system of heavy oil, researchers exploit a series of process engineering of heavy oil catalytic cracking which produces propylene.

China University of Petroleum (East China) exploits TMP technology on the basis of catalytic conversion processes uses double riser reactor. The technology takes heavy oil as feedstock, adopting two-section riser catalytic cracking process for segmented reaction, catalyst relay, and large catalyst-oil ratio. Optimization of feedstock method aimed at miscellaneous reactant takes place to control the reaction condition, in order to increase the yield of propylene. The foreign technology with high yield of propylene also adopts double riser reactor.

SINOPEC Research Institute of Petroleum Processing exploits DCC technology, which would produce more propylene with heavy oil as feedstock oil. And the DCC technology uses consecutive reactor composes of riser reactor and turbulent fluidized bed reactor. On the basis of DCC technology, Sinopec research institute of petroleum processing exploits enhanced catalytic cracking technology DCC-PLUS adopting new combination of reactors. The technology is similar to DCC in that, it also applies riser reactor and turbulent fluidized bed reactor. The technology is different to DCC in that, it leads another catalyst from regenerator into turbulent fluidized bed reactor. Both DCC and DCC-PLUS divide the reactor into two tandem cracking reaction region. It is said that catalytic cracking reaction takes place in both riser reactor and fluidized bed reactor. Feedstock oil cracks in riser reactor, and secondary cracking of intermediate products from riser reactor which could produce more propylene takes place in fluidized bed reactor. Because the catalyst in fluidized bed region is the spent catalyst from feedstock cracking reaction, the small molecule in fluidized bed region is difficult to catalytic crack, so it need to increase the reaction temperature in order to improve the yield of propylene by pyrolysis, which reduces the selectivity of propylene further. Both DCC and DCC-PLUS employ the regenerated catalyst cycling, with the same amount of feedstock, the space velocity of fluidized bed region can only be controlled by the level of catalyst in it. So it needs to install a catalyst output, to control the feedstock level by the outflow of catalyst. Because of gas-solid separation and catalyst carrying, it is dilute phase between fluidized bed reaction region and gas-solid separator. The oil gas carries amounts of catalyst when it get away from fluidized bed. The residence time after the petroleum gas leaves the fluidized bed and before it gets to the gas-solid separator is more than 20 seconds. Because the catalyst upon the catalyst lever carries oil gas, and the residence time of oil gas, it causes further side reaction, that the selectivity of propylene and product distribution will be affected, and the reaction would not stops timely. Moreover, the catalyst in fluidized bed region of DCC and DCC-PLUS is the catalyst with carbon disposition after the feedstock oil cracking reaction. In order to improve the yield of propylene, it need to increase the reaction temperature of fluidized bed reaction region, that restricts the cracking reaction and promotes thermal reaction, at the same time, the selectivity of propylene decreases sharply and the yield of dry gas and coke increases.

The prior art focuses on the yield of propylene, classified into two categories. The first category is tandem reaction in riser reactor and fluidized bed, and the second category is parallel reaction in double riser reaction. The prior art focuses on catalyst and changing reaction temperature, for example, it applies higher reaction temperature, catalyst-oil ratio and the amount of steam injected than FCC, in order to enhance the cracking reaction and improve the selectivity of propylene.

SUMMARY OF INVENTION

The present invention mainly aims to provide a multi-stage fluidized catalytic reaction process of petroleum hydrocarbons, which different properties of feedstock would crack under favorable condition. At the same time, it could control the catalyst and reaction temperature multi-step, so as to improve the selectivity of propylene, and reduce the yield of by-product, such as dry-gas and coke.

Another aim of the present invention is to provide a multi-stage fluidized catalytic reactor of petroleum hydrocarbon.

The technical solutions of the present invention are as follows:

A multi-stage fluidized catalytic reaction process of petroleum hydrocarbon, that partitioned reaction takes place in the same reactor, including the first order reaction and the second order reaction of feedstock oil, cracking reaction process of light hydrocarbons and/or cycle oil. In the present process, catalyst replacement and two-stage relayed reaction takes place between the first and second order reaction of feedstock oil. Two-stage reaction of light hydrocarbons and/or cycle oil takes place too. These reactions take place in different region in the same reactor. The first order reaction of light hydrocarbons and/or cycle oil takes place in independent region.

The catalytic cracking feedstock oil is fed into the first reaction region (also called feedstock reaction region or feedstock cracking reaction region), and the first order reaction takes place in condition of catalyst (regenerated catalyst), then the catalyst is separated in the output of the first reaction region. The oil gas flows from the first reaction region output stream conveyor pipe, which is installed in the third reaction section, into the second reaction region to continue deeply cracking. The first catalyst is fed into the first reaction section under the input of feedstock oil, and into the first reaction region by pre-lifting medium. The stream of the second reaction region is fed into the settler by conveyor pipe to comply gas-solid separation.

The first reaction region adopts riser reactor, which installs a catalyst splitter (cyclone gas-solid separator) in the output.

The second catalyst is fed into the third reaction region in the third reaction section (the third reaction region is installed upon the first reaction section, which is the reaction region of light hydrocarbon and cycle oil). Light hydrocarbon and/or cycle oil is fed into the third reaction region for the independent first order reaction in surroundings of the second catalyst. And then, the catalyst and product is fed up to the second reaction region to continue the second order cracking reaction (the catalyst of the third reaction region after reaction is used in the second reaction region continuously).

According to the specific implementation method of the present invention, the third reaction region adopted the reaction condition of turbulent fluidized bed or circulating fluidized bed. When implementing, the second catalyst is fed into the third reaction region to react with the feedstock in the region. The third reaction region is installed around the first reaction region output stream conveyor pipe above the first reaction region, the second catalyst fed into the third reaction region from outside of the reactor is fluidized by steam, so that the turbulent fluidized bed or circulating fluidized bed is formed. The products and part of the catalyst from the first reaction region, and the catalyst after reaction and gas from the third reaction region, merge together into the second reaction region above, the second order catalytic reaction takes place in the second reaction region, and it realizes cracking conversion once more.

The products and catalyst from the third reaction region and the oil gas from the first reaction region are fed into the second reaction region to continue reaction.

The multi-stage fluidized catalytic reaction process of petroleum hydrocarbon mentioned above, further, the reaction process takes place in a petroleum hydrocarbon multi-stage fluidized catalytic reactor partitioned up and down. Steps as follow:

The first catalyst is fed into the pre-lifting section (or catalyst conveyor section) of the first reaction section through the first catalyst input pipe, fluidized by pre-lifting medium and conveyed to the first reaction region. The feedstock is atomized by steam through feedstock input into the first reaction region in the first reaction section, mixes and contacts and vaporizes with the first catalyst, and the first order catalytic cracking reaction takes place (specifically, the reaction takes place in the riser reactor, the feedstock is atomized to drops by steam by nozzle, and contacts with catalyst and acquires heat, so that the catalytic cracking reaction of feedstock oil takes place. The first reaction region mainly realizes the conversion of feedstock oil to olefin-rich gasoline and diesel components. Although not necessary, in general, the reaction time of the first reaction region should be controlled within 1.5 seconds, not more than 2.5 seconds, and the reaction temperature should be controlled below 540° C.). After the first order catalytic cracking reaction, part of the catalyst is separated from the catalyst splitter which is installed in the output of the first reaction region (when implementing, the splitting ratio of the catalyst from the first reaction region is 70% to 90%, and 10% to 30% of the catalyst is remained in the reaction oil gas, which is fed to the second reaction region together with the reaction oil gas). The catalyst separated from the first reaction output stream settles into the first stripping section, flows out of the reactor from the spent catalyst conveyor pipe after stripping. The oil-gas is conveyed into the second reaction region above, through the first reaction region output stream conveyor pipe, and the second order catalytic cracking reaction takes place (when implementing, in the second order catalytic cracking reaction, it can increase the steam ratio further, to reduce the partial pressure of petroleum hydrocarbons.

The second catalyst is fed into the third reaction region in the third reaction section which is installed between the first stripping section and the second reaction section. The light hydrocarbon and/or cycle oil is fed into the third reaction region. Independent first order catalytic cracking reaction takes place in the surrounding of the second catalyst. And then, the catalyst and products of the third reaction region is fed into the second reaction region, to continue the second order catalytic cracking reaction. Specifically, the light hydrocarbon it is said may be C4 component or petroleum hydrocarbons with a final boiling point below 210° C.

In the third reaction region, the catalyst is fluidized with steam, so that the turbulent fluidized bed or circulating fluidized bed is formed in this area, and these steam enter the second reaction region at the same time.

The gas and catalyst after reaction in the second reaction region are conveyed to the cyclone separator in the settler for gas-solid separation, and the reaction product flows out of the settler.

The catalyst after reaction in the second reaction region is fed to the first catalyst stripping region installed in the first stripping section through the catalyst reflux pipe of the second reaction region, stripped with the catalyst separated from the first reaction region through catalyst splitter, and flows out of the reactor from the spent catalyst conveyor pipe after stripping. Or the second stripping section is installed out of the second reaction region. The second spent catalyst flows out of the reactor through catalyst output pipe after stripping.

According to the specific implementation method of the present invention, when there are multiple feedstock in the third reaction region, the feedstock is fed into the third reaction region hierarchically according to the boiling point or final boiling point. The components with low boiling point or final boiling point is fed into the third reaction region in the lower layer, and the components with higher boiling point or final boiling point is fed into the third reaction region in the higher layer successively. When the light hydrocarbon and light cycle oil react in the third reaction region at the same time, the light hydrocarbon is fed into the reaction region below the third reaction region, and the light cycle oil is fed into the third reaction region above the light hydrocarbon.

The multi-stage fluidized catalytic reaction process of petroleum hydrocarbons mentioned above, further, the first reaction region adopts riser reactor, which is also called conveyor bed. The third reaction region adopts turbulent fluidized bed or circulating fluidized bed. The second reaction region adopts circulating fluidized bed or turbulent fluidized bed. When it aims at increasing the yield of propylene, the superficial velocity of the turbulent fluidized bed said is lower than 1.2 m/s, and the superficial velocity of circulating fluidized bed said is 1.2 m/s to 4.0 m/s.

The multi-stage fluidized catalytic reaction process of petroleum hydrocarbons mentioned above, furthermore, the third reaction section said is divided vertically into several independent section by the vertical clapboards and/or vertical barrels (specifically, the clapboards and the barrels said could be connected or supported to the shell of the third reaction section). The catalyst fed to the third reaction section is fed into each district through the connected channel in the bottom of the clapboard section and/or barrel section. All or part of the said clapboard section and/or barrel section is used as the third reaction region. Light hydrocarbon and/or cycle oil reacts in one or several or all of the said clapboard section and/or barrel section. When there are several kinds of feedstock in the third reaction region, different feedstock reacts in disparate clapboard section or barrel section with its own reaction condition. Especially when the C4 component is fed into the third reaction section, it reacts in the independent clapboard section or barrel section preferentially.

The multi-stage fluidized catalytic reaction process of petroleum hydrocarbons mentioned above, further, the amount of the feedstock fed into the third reaction region which is the amount of the light hydrocarbon and/or cycle oil is controlled by the carbon content of catalyst after reaction in the second reaction region which is the activity of the catalyst in the second reaction region, which could control the carbon content of catalyst after reaction in the second reaction region less than 0.8%. Or the amount of the feedstock fed into the third reaction region which is the amount of the light hydrocarbon and/or cycle oil is controlled by the carbon content of catalyst after reaction in the third reaction region which is the activity of the catalyst in the third reaction region, which could control the carbon content of catalyst after reaction in the third reaction region less than 0.4%. When implementing, when the light hydrocarbon and cycle oil could not meet the carbon content of the catalyst in the second reaction region, catalyst heat exchange pipe is installed in the third reaction region, which can meet the control requirement of catalyst in the second reaction region by heat exchanging. When the third reaction section is divided into several region, the catalyst heat exchange pipe could installed in the isolated district which is set as the third reaction region (the heat exchange pipe is installed in isolated reaction region, where heat exchange and reaction take place in), or installed in isolate district which is not set as the third reaction region. Catalyst heat exchange in fluidized bed is common technology, no longer detailed.

The multi-stage fluidized catalytic reaction process of petroleum hydrocarbons mentioned above, further, the reaction temperature of the second reaction region is higher than or the same with the first reaction region. Preferably, the reaction temperature of the second reaction region is higher than the first reaction region by 0° C. to 70° C., more preferably, the reaction temperature of the second reaction region is higher than the first reaction region by 10° C. to 70° C. The reaction temperature of the second reaction region is controlled by the amount of the second catalyst.

The multi-stage fluidized catalytic reaction process of petroleum hydrocarbons mentioned above, further, the fourth reaction region is installed between the second reaction region and the shell of the second reaction section, which is used for the reaction of light hydrocarbon or cycle oil.

The present invention provides a multi-stage fluidized catalytic reactor of petroleum hydrocarbons:

The reactor includes the first reaction section, catalyst splitter, the third reaction section, the second reaction section and settler from bottom up.

The first reaction section is a riser reactor, including the first catalyst input pipe, pre-lifting section, feedstock oil input, the first reaction region from bottom up, which is used for the reaction of feedstock oil. The first stripping section is installed around the feedstock oil reaction region, which is the first reaction region. The said catalyst splitter is installed at the output of the first reaction region, which is also at the top of the first catalyst stripping region in the first stripping section.

There is a clapperboard installed between the first catalyst stripping region and the third reaction section, and the first reaction region output stream conveyor pipe is installed on the clapboard. The second reaction region is installed in the second reaction section, the third reaction region is installed in the third reaction section. The first reaction region output stream conveyor pipe is installed at the input of the second reaction region which is at the top of the third reaction region (the first reaction region output stream conveyor pipe is in the third reaction region). There are light hydrocarbon or cycle oil input and the second catalyst input pipe installed in the third reaction section, which is used for the reaction of light hydrocarbon and cycle oil.

The second clapboard is installed between the third reaction section and the outside of the second reaction region which is in the second reaction section. Conveyor pipe is installed between the second reaction region and the gas-solid separator in the settler. The multi-stage fluidized catalytic reactor of petroleum hydrocarbons mentioned above, further, the first reaction section, the catalyst splitter, the first stripping section, the third reaction section, the second reaction section, and the settler are installed coaxially up and down.

The multi-stage fluidized catalytic reactor of petroleum hydrocarbons mentioned above, further, a porous plate is installed between the third reaction section and the second reaction region. The stream from the first reaction region and the catalyst and gas from the third reaction region is distributed to the second reaction region through the porous plate.

The multi-stage fluidized catalytic reactor of petroleum hydrocarbons mentioned above, further, the catalyst reflux pipe between the second reaction section and the first stripping section, which the catalyst after reaction in the second reaction region refluxes to the first stripping section directly. Or the catalyst reflux pipe between the second reaction section and the first stripping section, and the second stripping section is arranged outside the second reaction region (which is between the second reaction region and the shell of the second reaction section), that the catalyst after reaction in the second reaction region refluxes to the first stripping section through the catalyst reflux pipe in the second reaction region after stripping in the second stripping section. When implementing, the outside of the second reaction region could be used as the storage region of the catalyst after reaction in the second reaction region, the catalyst separated from the gas-solid separator in the settler is fed into this storage region preferentially, and then flows out of the reactor after stripping in the first stripping section. Alternatively, a stripping unit is installed in the storage region, which can be used as a second stripping section. A catalyst output pipe (nozzle) is installed in the second stripping section, the catalyst separated from the gas-solid separator flows out of the reactor after stripping in the storage region, or fed into the first stripping section after stripping in the second stripping section.

The multi-stage fluidized catalytic reactor of petroleum hydrocarbons mentioned above, further, the fourth reaction is installed in the periphery of the second reaction region (between the second reaction region and the shell of the second reaction section) when it is need, which is used for the independent reaction of cycle oil or recycle oil. When there is the fourth reaction region installed out of the second reaction region, the fourth reaction region should be installed above the second stripping section. When implementing, the catalytic conversion takes place with the remaining heat and activity of the catalyst from the second reaction region in the mentioned fourth reaction region. And the fourth reaction region would adopt the condition of bubbling fluidized bed or turbulent fluidized bed. When C4 is refined independently, C4 could be fed into the pre-lifting section below the first reaction region.

The multi-stage fluidized catalytic reactor of petroleum hydrocarbons mentioned above, further, the district between the shell of the third reaction section and the first reaction region output stream conveyor pipe is divided into several isolated regions which are clapboard regions and/or barrel regions by vertical clapboards and/or vertical barrels (the clapboards and barrels could be connected or supported to the shell of the third reaction section). The vertical clapboards or vertical barrels are interconnected at the bottom, so that the catalyst could circulate in each region. Input of light hydrocarbon and steam is installed in the bottom of part or all of the clapboard regions and/or barrel regions, that different feedstock could react in different clapboard region and/or barrel region in respective conditions. When implementing, steam input is installed in the bottom of all the clapboard region and/or barrel region, and light hydrocarbon input is installed in the region where isolate reaction is need. In the present invention:

1. When it need to increase the catalyst-oil ratio of the first reaction section, catalyst reflux pipe could be installed between the third reaction region or the second stripping section or the first catalyst stripping region of the first stripping section and the pre-lifting section of the first reaction section, that the catalyst could reflux to the pre-lifting section from the third reaction region or the second stripping section or the first catalyst stripping region.

2. Each units of the reactor is arranged in one from top down, preferably (generally) arranged coaxially from top down. The first reaction section is installed at the bottom, the third reaction section is installed between the first and second reaction section, the second stripping section is installed in the outside of the second reaction region, the settler is installed at the top, there are two-stage gas-solid separators in the settler. The second reaction region connects to the first order gas-solid separator by conveyor pipe. The feedstock of the second reaction region is fed into the gas-solid separator through the conveyor pipe, which avoids the oil gas fed into the dilute phase of the settler, and quick gas-solid separation and space velocity termination is realized.

3. The first reaction section of the reactor in the present invention is riser reactor, including the pre-lifting section, the first reaction region, the first stripping section, the first catalyst input pipe, spent catalyst conveyor pipe. The second reaction section includes the second reaction region, catalyst (after reaction) output pipe. The third reaction section includes the third reaction region, the first reaction region output conveyor pipe, and the second catalyst input pipe.

4. Independent steam input could be installed in the third reaction section. The steam is fed into the second reaction region from the third reaction region, which supplies the steam required in the second reaction region.

5. The C4 component, catalytic light gasoline, gasoline or naphtha component mentioned in the present invention, that the final boiling point is not higher than 210° C. The cycle oil includes light cycle oil and heavy cycle oil. The light cycle oil mentioned is the petroleum hydrocarbon or light diesel component with boiling point 180° C. to 255° C. The heavy cycle oil mentioned is the petroleum hydrocarbon or heavy diesel component with boiling point 250° C. to 365° C. The recycle oil is the petroleum hydrocarbon component with boiling point 340° C. to 520° C.

Advantageous Effects of the Present Invention

Partitioned reaction of different feedstock realizes in the present invention, at the same time, catalyst replacement, the stepped control of the reaction temperature, and the control of carbon content in the spent catalyst realizes too. It provides suitable reaction environment and condition for different feedstock, that it increases the efficiency of the catalyst in the reactor. The yield of dry gas and coke decreases obviously, and the yield of propylene increases, and the economic efficiency improves. Because the feedstock of the second reaction region is the gas phase from the first reaction region and the third reaction region, the carbon content of catalyst in the second reaction is essential to the selectivity of the reaction.

In the present invention, multi-stage control of feedstock, catalyst, reaction temperature realizes. Different feedstock and different reaction stage adopts the same fluidized reactor. The concise apparatus will not change the arrangement and installation condition of the common reaction settler, and the investment and operating cost will reduce drastically.

In some specific implementation cases, the reaction process of the present invention is as follows:

The catalytic fluidized feedstock heated to 200° C. to 350° C. is fed to the atomizing nozzle in several ways. Steam equivalent to the amount of 3% to 5% of feedstock oil is atomized and fed into the riser reactor of the first reaction section at the bottom, mixes with the first catalyst (regenerated catalyst) conveyed by the pre-lifting gas. Catalytic cracking reaction takes place in the first reaction region for 1 second to 2 seconds after atomizing. The reaction temperature is about 500° C. The reaction heat is supplied by the regenerated catalyst. The reaction oil gas and steam conveys the catalyst to the output of the first reaction region. Part of the catalyst is separated by the cyclone splitter. The oil gas is fed to the first reaction region output stream conveyor pipe which is installed in the third reaction section. The second catalyst is replenished in the third reaction section, which meets the oil gas from the first reaction region at the output of the first reaction region output stream conveyor pipe, and flows up to the second reaction region. It realizes catalyst replenishment in the second reaction region. The oil gas from the first reaction region cracks in the condition of fresh catalyst. The carbon content of the catalyst in the second reaction region would be controlled to 0.6%, no more than 0.8%, which improve the activity of the catalyst. According to the requirement of the products, the reaction time is 1.0 second to 6.0 seconds, at the same time, the reaction temperature increases, and the conversion improves too.

DESCRIPTION OF THE REFERENCE NUMBERS IN THE FIGURES

110: The first reaction section, 112: Per-lifting section, 113: Feedstock oil input (nozzle), 114: Catalyst splitter, 115: The first reaction region, 116: Clapboards, 118: The first catalyst input pipe, 121: The third reaction section (light hydrocarbon and cycle oil reaction region), 122: The first reaction region output stream conveyor pipe, 123: The first steam distributor, 124: Light hydrocarbon and/or cycle oil input, 125: The third reaction region, 125Y: Clapboard region, 125T: Barrel region, 126: Vertical clapboard, 127: Vertical barrel, 128: The second catalyst input pipe, 131: The first stripping section, 132: The second steam distributor, 133: The first catalyst stripping section, 134: Spent catalyst conveyor pipe, 135: Stripping internals, 138: Catalyst reflux pipe, 141: The second reaction section, 142: The third steam distributor, 143: The third stripping section, 144: Catalyst (after reaction) output pipe, 145: The second reaction region, 146: Conveyor pipe, 147: Porous plate, 148: The second reaction region catalyst reflux pipe, 149: The second clapboard, 151: Settler, 152: Settler dilute phase, 153: The first gas-solid separator, 154: The second gas-solid separator, 155: The fourth reaction region (fluidized bed or turbulent fluidized bed reaction region), 156: Product output.

Y: Feedstock oil, Y1: Light hydrocarbon feedstock, Y2: Light cycle oil feedstock, Y3: Heavy cycle oil or recycle oil, G: Pre-lifting medium, P: Reaction product, S: Steam, A1: The first catalyst (catalyst fed into the first reaction section), A2: The second catalyst (catalyst fed into the second reaction section), B1: Spent catalyst, B2: The second spent catalyst (catalyst after reaction in the second reaction region, the third reaction region and/or the fourth reaction region), P1: Stream after reaction in the first reaction region (fed into the second reaction region), P3: Stream after reaction in the third reaction region (fed into the second reaction region).

FR: Flow recording instrument, FRC: Flow control instrument, TIC: Temperature control instrument.

DETAILED DESCRIPTION OF INVENTION

Figure 1:
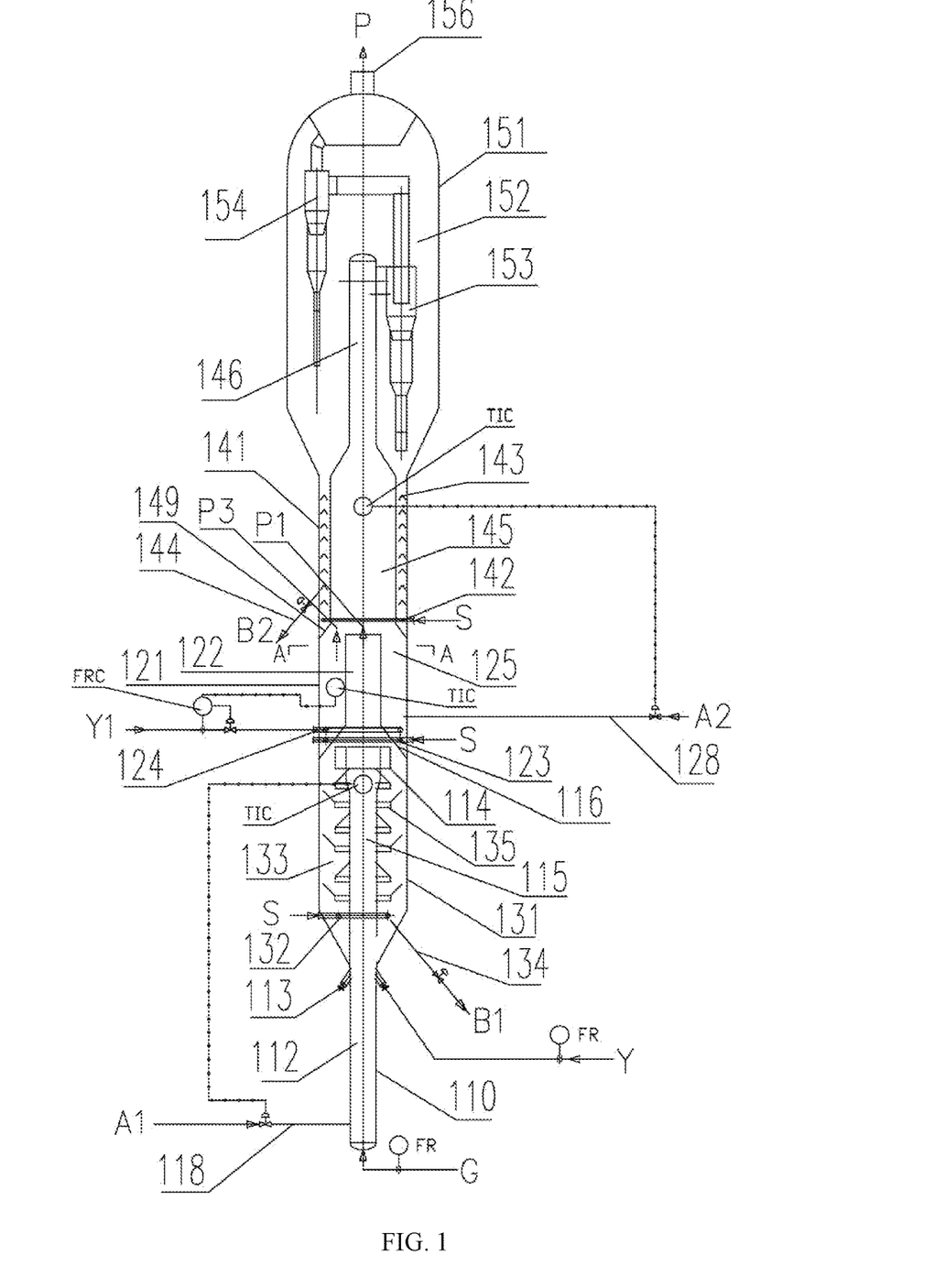
FIG. 1 is the schematic structural diagram of the implementation case 1 of the petroleum hydrocarbon multi-stage fluidized catalytic reaction process in the present invention.
Figure 2:
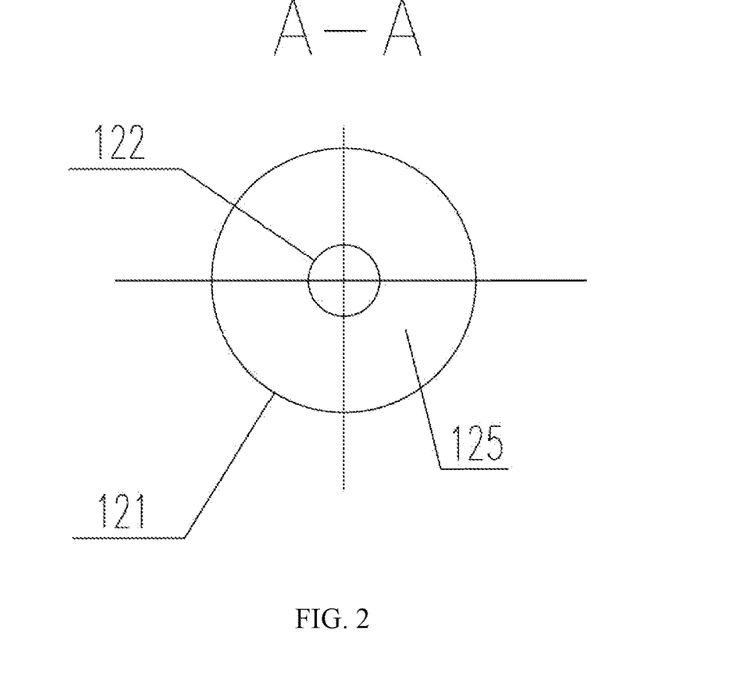
FIG. 2 is the A-A view of FIG. 1, which is the schematic diagram of the distribution of the first reaction region output stream conveyor pipe.
Figure 3:
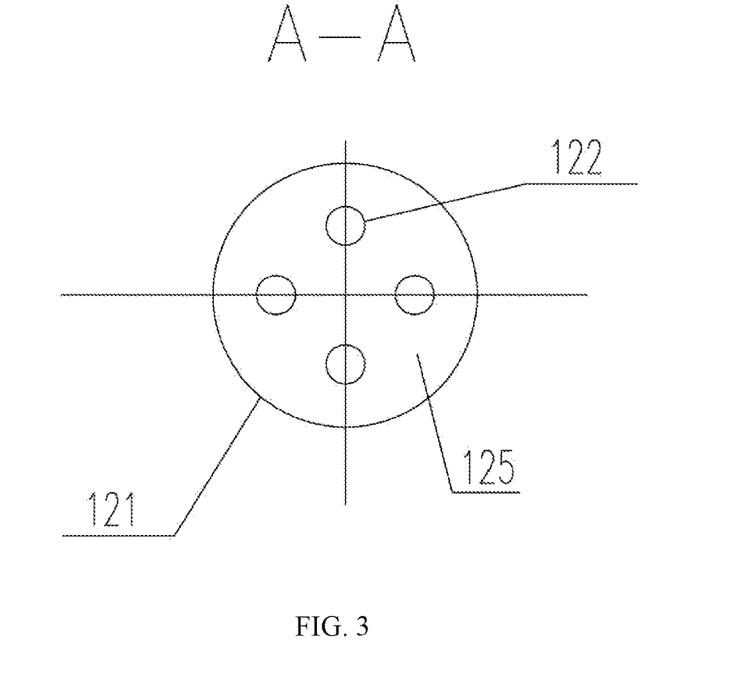
FIG. 3 is the A-A view of FIG. 1, which is the schematic diagram of the second type of distribution of the first reaction region output stream conveyor pipe.

The technical solution of the present invention will be described in detail with reference to the implementation methods and cases. The scope of protection for the present invention includes but not limited to the following implementation cases:

The specific implementation process is as follows:
Implementation Method 1:
As shown in FIGS. 1 to 3,
The multi-stage fluidized catalytic reaction process of petroleum hydrocarbon in the present invention, multi-stage reaction takes place in the same reactor, including the first order reaction of the feedstock oil, the second order reaction of the feedstock oil, light hydrocarbon and/or cycle oil cracking reaction process. In the process of the first and second order reaction of the catalytic cracking feedstock oil, the catalyst replacement and two-stage relay reaction takes place, and two-stage relay reaction of light hydrocarbon and/or cycle oil takes place too. The reaction mentioned takes place in different region of the same reactor. Light hydrocarbon and/or cycle oil reacts in independent region.

From bottom up, the reactor consists of the first reaction section 110, catalyst splitter 114, the third reaction section 121, the second reaction section 141 and settler 151.

The first reaction section 110 is riser reactor, which is adopting riser reaction condition. From bottom up, it includes the first catalyst input pipe 118, pre-lifting section 112, feedstock input 113, the first reaction region 115, which is used for the reaction of the feedstock oil Y. The first stripping section 131 is installed around the feedstock oil reaction region which is the first reaction region 115, and stripping internal 135 is installed in the first stripping section 131. Catalyst splitter 114 is installed at the output of the first reaction region 115, and at the top of the first catalyst stripping section which is in the first stripping section.

Clapboard 116 is installed between the first catalyst stripping section 133 and the third reaction section. The first reaction region output stream conveyor pipe 122 is installed on clapboard 116. The first reaction region output stream conveyor pipe 122 is at the top of the third reaction region 125, and the input of the second reaction region 145. Light hydrocarbon and/or cycle oil input 124 and the second catalyst input pipe is installed in the third reaction section 121, which is used for the reaction of light hydrocarbon and cycle oil.

The second reaction region 145 is installed inside the second reaction section 141. The second clapboard 149 is installed between the third reaction section and the outside of the second reaction region 145 which is installed inside the second reaction section 141. Conveyor pipe 146 is installed between the second reaction region and the gas-solid separator installed in settler 151.

Stripping component is installed in the catalyst storage region after reaction in the second reaction region which is in the outside of the second reaction region. The storage region is used as the second stripping section 143. Catalyst (after reaction) output pipe 144 is installed in the second stripping section 143. The catalyst separated from the gas-solid separator is stripped by steam S which is fed by the third steam distributor 142 in the storage region. The second spent catalyst B2 flows out of the reactor through catalyst (after reaction) output pipe 144.

When implementing, the first reaction section 110, catalyst splitter 114, the first stripping section 131, the third reaction section 121, the third reaction region 125, the second reaction section 141 and settler 151 are installed coaxially from top down. Catalyst splitter 114 is circumferential swirling. The first reaction region output stream conveyor pipe 122 may be installed inside the third reaction region. As shown in FIG. 2, a first reaction region output stream conveyor pipe 122 is installed in the center of the third reaction region, coaxially with the first reaction region. Or several first reaction region output stream conveyor pipe 122 is installed in the third reaction region, coaxially with the first reaction region, as shown in FIG. 3, four first reaction region output stream conveyor pipe 122 is installed side by side evenly.

The following steps take place in the reaction process:

The first catalyst A1 fed to the pre-lifting section 112 in the first reaction section 110 through the first catalyst input pipe 118 is conveyed to the first reaction region 115 by the pre-lifting medium G. Feedstock Y is fed to the first reaction region 115 in the first reaction section 110 through feedstock input 113 after atomized by steam. Feedstock Y and the first catalyst A1 is mixed and the first order catalytic cracking reaction takes place. After the first order catalytic cracking reaction, part of the catalyst is separated from catalyst splitter 114. The separated catalyst settles to the first catalyst stripping region 133 in the first stripping section 131. After stripped by steam S fed by the second steam distributor 132 in the first catalyst stripping section 133, spent catalyst B1 flows out of the reactor through spent catalyst conveyor pipe 134. Oil gas (included in the stream P1 after reaction in the first reaction region) is fed to the second reaction region 145 through the first reaction region output stream conveyor pipe 122, for the second order catalytic cracking reaction.

The second catalyst A2 is fed into the third reaction region 125 in the third reaction section 121 which is installed between the first stripping section 131 and the second reaction section 141. Light hydrocarbon feedstock Y1 is fed into the third reaction region 125, and the first order catalytic cracking reaction takes place in the environment of the second catalyst A2 independently. And then the catalyst and product of the third reaction region which is stream P3 after reaction in the third reaction region, together with the oil gas of the first reaction region is fed to the second reaction region 145, the second order catalytic cracking reaction takes place. In the third reaction region 125, catalyst is fluidized by steam S fed by the first steam distributor 123, so that fluidized bed or turbulent fluidized bed condition forms in the region. All the steam is fed to the second reaction region 145.

The gas and catalyst after reaction in the second reaction region is conveyed to settler 151 through conveyor pipe 146. Gas-solid separation takes place in the first order gas-solid separator 153 and the second order gas-solid separator 154. Product P flows out of the reactor through product output 156 (do not flow through settler dilute phase region 152).

Catalyst after reaction in the second reaction region is stripped in the second stripping section 143. The second spent catalyst B2 flows out of the reactor through catalyst output pipe 144.

In the present implementation method, specifically, after atomized by steam, the fresh catalytic feedstock oil Y is fed to the first reaction region through feedstock input 113, mixes with the first catalyst A1 which is the regenerated catalyst conveyed by the first catalyst conveyor pipe 118, and atomizes. After catalytic cracking reaction for about 1.2 seconds in the first reaction region, 85% of the catalyst is separated from the feedstock oil product by catalyst splitter 114 in the first reaction region output, and the oil gas flows into the first reaction region output stream conveyor pipe. Another catalyst the second catalyst A2 is fed to the bottom of the third reaction region through the second catalyst input pipe. Light hydrocarbon feedstock which is C4 and light gasoline is fed to the bottom of the third reaction region 125, and reacts in the environment of catalyst A2. The reaction gas and catalyst of the third reaction region together with the oil gas from the first reaction region output stream conveyor pipe 122 is fed to the second reaction region to continue reacting. Spent catalyst B1in the first reaction region flows out of the reactor through spent catalyst conveyor pipe 134. The second spent catalyst B2 after reaction in the second reaction region flows out of the reactor after stripped in the second stripping section 143 through catalyst output pipe 144.

The first reaction region is designed by riser condition. The second reaction region is designed by circulating fluidized bed condition, and the gas apparent velocity is about 2.0 m/s. The third reaction region is designed by turbulent fluidized bed condition, and the gas apparent velocity is 0.6 m/s to 1.0 m/s, the catalyst space velocity is 4 to 6. The reaction temperature of the first reaction region is about 500° C. The reaction temperature of the 3nd reaction region is about 550° C. The reaction temperature of the third reaction region is about 590° C. to 610° C.

The first catalyst A1 is regenerated catalyst. The second catalyst is catalyst with carbon content 0.1% to 0.2%.

Steam is replenished in the third reaction region, which participate the reaction in the third reaction region, and then is fed to the second reaction region to decrease the partial pressure of oil gas.

In the diagrams, FR is flow recording instrument, FRC is flow control instrument, and TIC is temperature control instrument.

Figure 4:
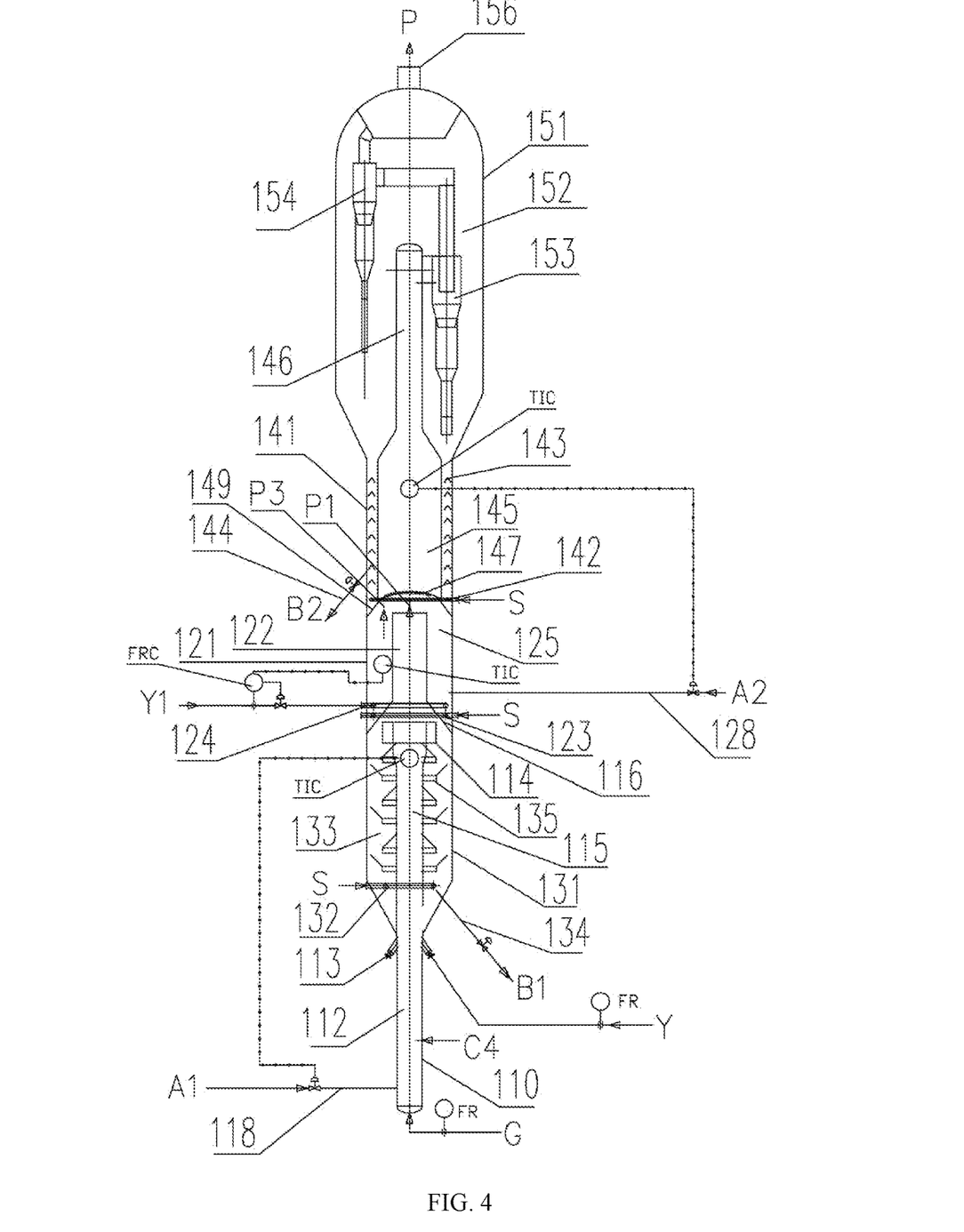
FIG. 4 is the schematic structural diagram of the implementation case 2 of the petroleum hydrocarbon multi-stage fluidized catalytic reaction process in the present invention. There is a porous plate (distribution plate) installed at the input of the second reaction region.

Implementation Method 2:

As shown in FIG. 4, the multi-stage fluidized catalytic reaction process of petroleum hydrocarbon, porous plate 147 is installed in the second reaction region input which is between the third reaction region 121 and the second reaction region 145. Stream from the first reaction region and catalyst and gas from the third reaction region is fed to the second reaction region 145 through the porous plate 147.

C4 component is first fed to the lower part of feedstock input 113. The first catalyst A1 contacts and reacts with C4 component first, and then flows up to contact and react with feedstock oil Y.

The equipment structure of other parts is the same with implementation method 1.

Figure 5:
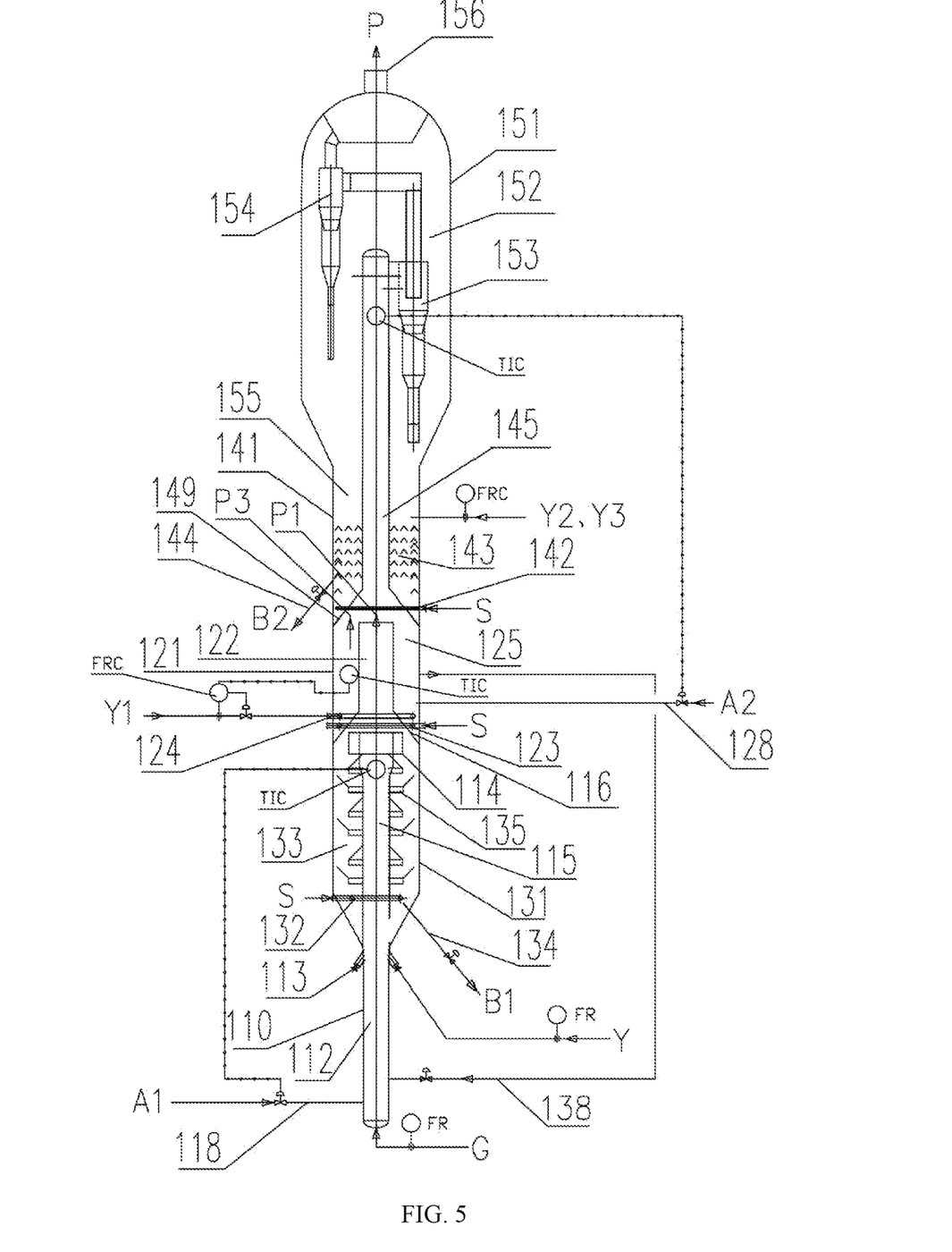
FIG. 5 is the schematic structural diagram of the implementation case 3 of the petroleum hydrocarbon multi-stage fluidized catalytic reaction process in the present invention. The fourth reaction region is installed.

Implementation method 3:

As shown in FIG. 5, the multi-stage fluidized catalytic reaction process of petroleum hydrocarbon, the second reaction region 145 is riser reaction region (the upper part of the riser is equivalent to the conveyor pipe in FIG. 1). The riser outlet is directly connected to the first stage gas-solid separator 153 of the settler. The second stripping section and the fourth reaction region 155 are arranged on the periphery of the riser reaction region. The fourth reaction region is installed upon the second stripping section. Light cycle oil feedstock Y2 and heavy cycle oil or recycle oil Y3 is fed into the fourth reaction region 155.

Catalyst reflux pipe 138 is arranged between the third reaction region 125 and pre-lifting section 112 in the first reaction section. Part of the catalyst refluxes to pre-lifting section 112, to participate the catalytic reaction of feedstock oil Y.

The equipment structure of other parts is the same with implementation method 1.

Figure 6:
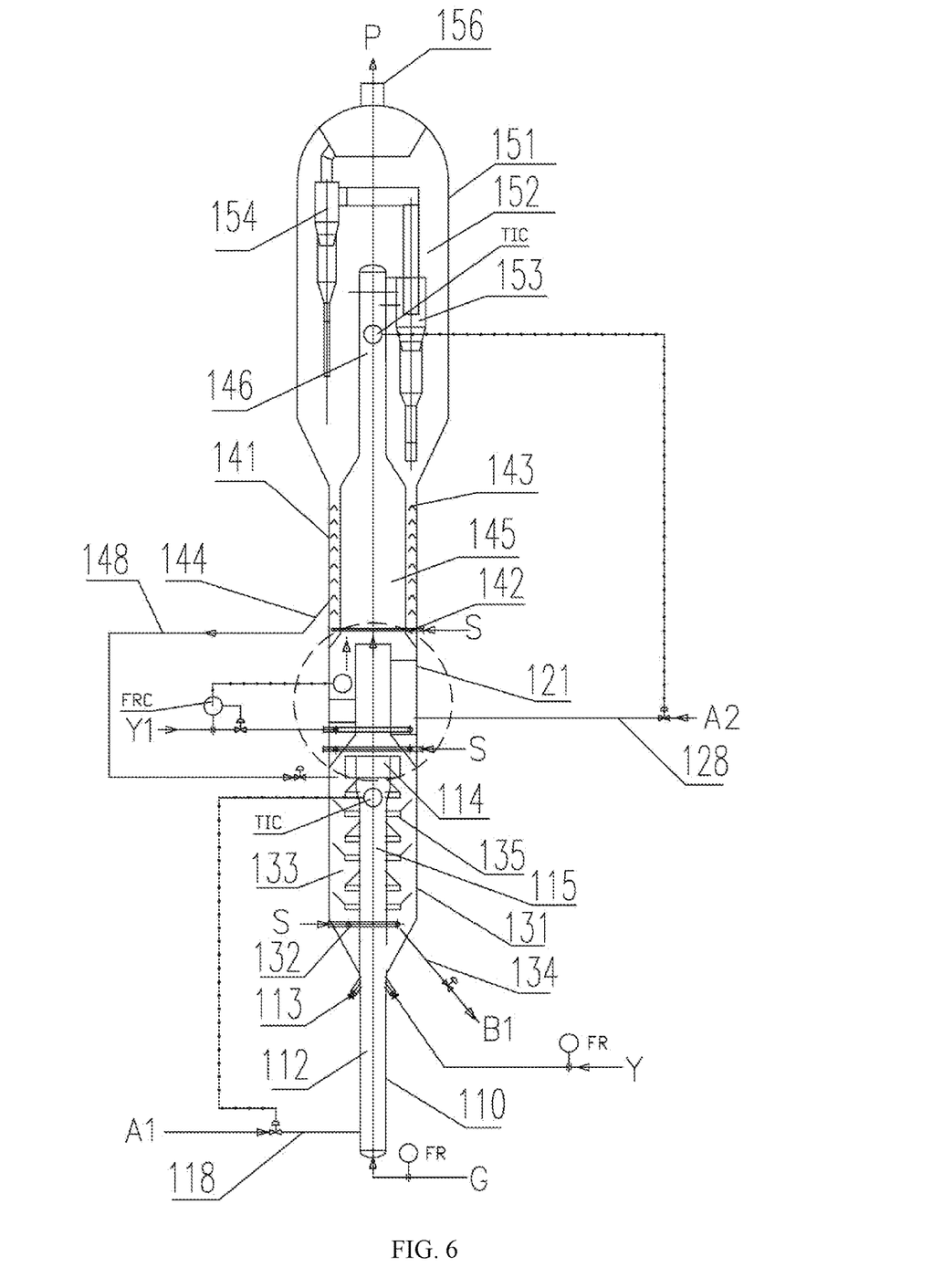
FIG. 6 is the schematic structural diagram of the implementation case 4 of the petroleum hydrocarbon multi-stage fluidized catalytic reaction process in the present invention. The catalyst after reaction in the second reaction region refluxes to the first stripping section.
Figure 7:
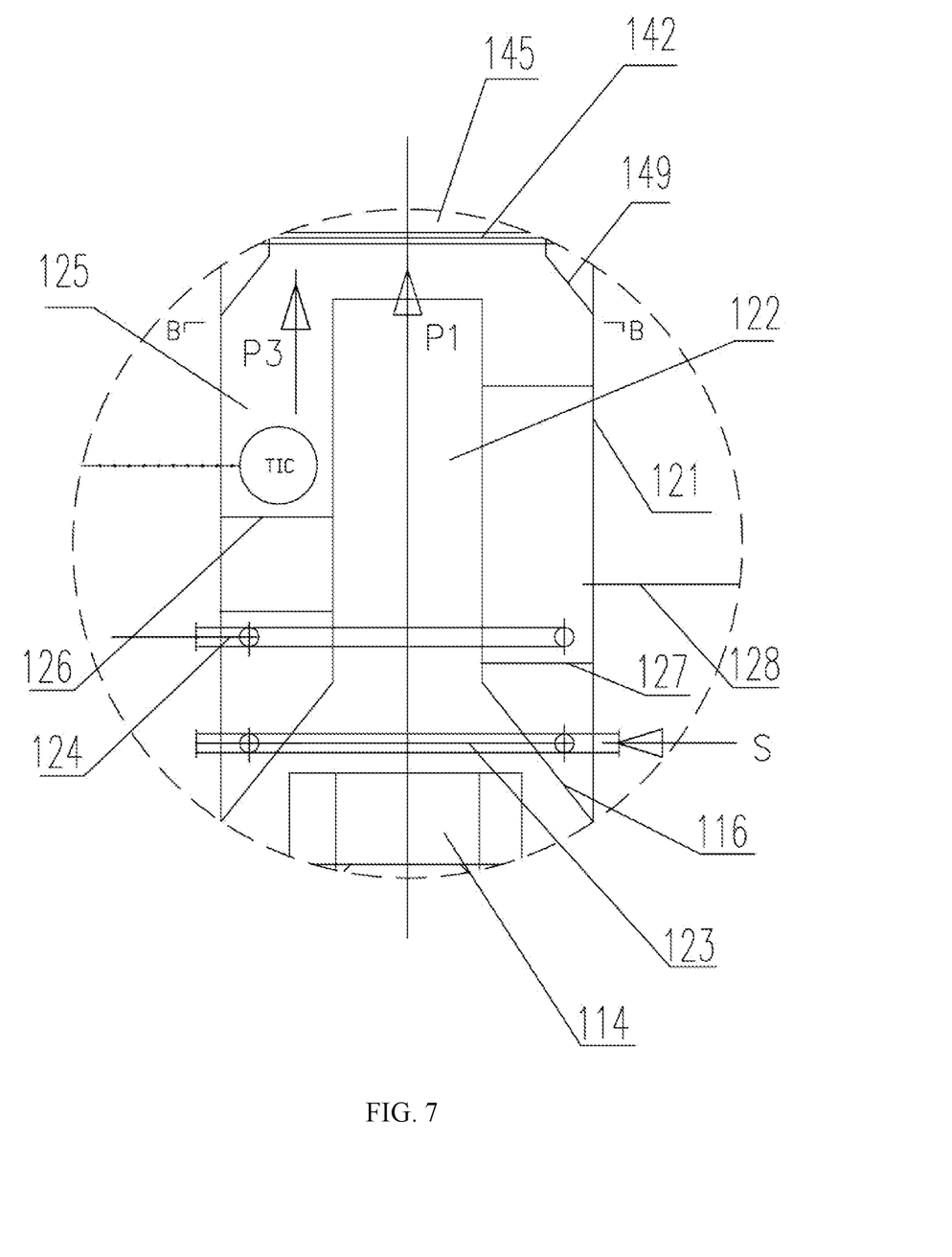
FIG. 7 is the partial enlarged view of the third reaction section in FIG. 6.
Figure 8:
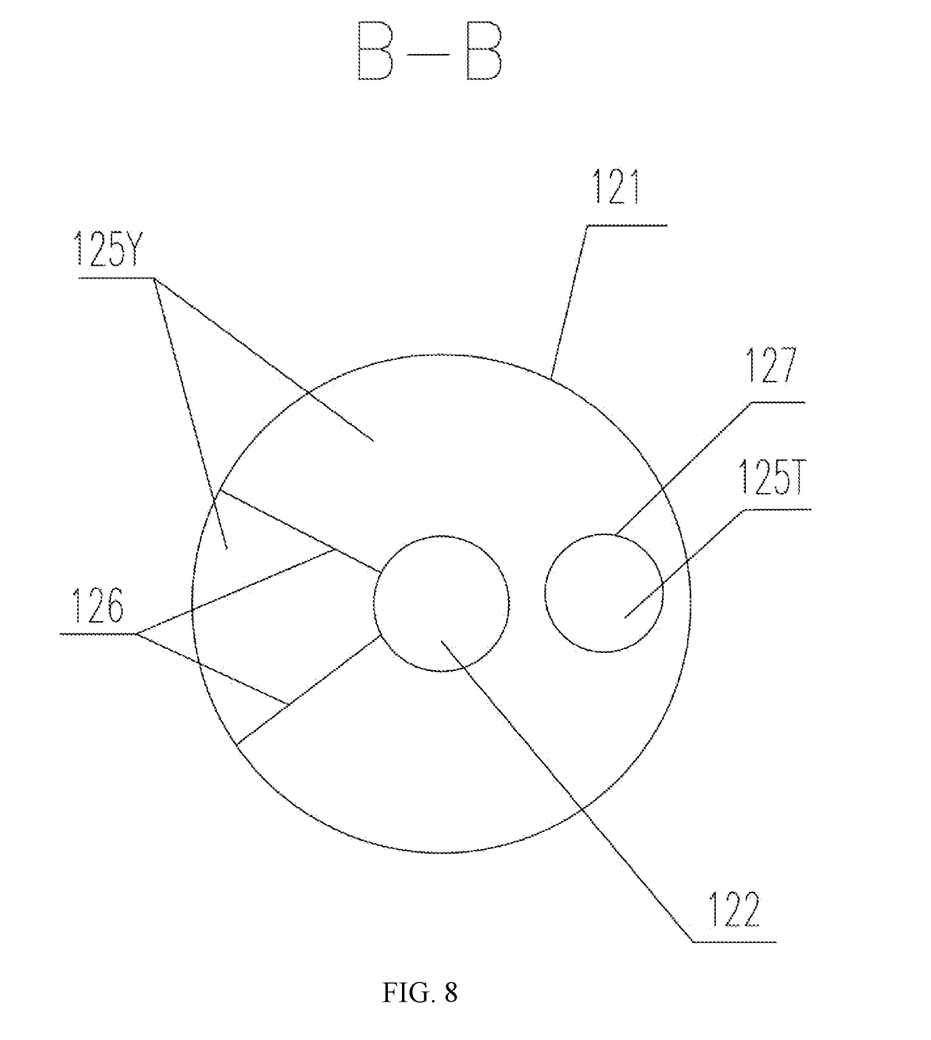
FIG. 8 is the B-B view of FIG. 7, which is the cross section diagram of the third reaction section divided into several isolated region.

Implementation Method 4:

As shown in FIGS. 6 to 8, the multi-stage fluidized catalytic reaction process of petroleum hydrocarbon, the second reaction region catalyst reflux pipe 148 is installed between the second reaction section 141 and the first stripping section 131. After stripped in the second stripping section 143, the catalyst after reaction in the second reaction region, is fed to the first catalyst stripping region 133 in the first stripping section 131 through the second reaction region catalyst reflux pipe 148, to strip together with catalyst separated from the first reaction region 115 by catalyst splitter 114, and flows out of the reactor through spent catalyst conveyor pipe 134 after stripping.

As shown in FIGS. 7 to 8, the interspace between the shell of the third reaction section and the first reaction region output stream conveyor pipe is divided by two vertical clapboards 126 and a vertical barrel 127 into three isolate regions, which are two clapboard regions 125Y and a barrel region 125T. Two vertical clapboards 126 are connected to the shell of the third reaction section 121, and the vertical barrel 127 is supported on the shell of the third reaction section 121. The bottom ends of the vertical clapboards 126 and the vertical barrel 127 are connected to each other to realize the flow of the catalyst in each region. Light hydrocarbon and steam input is arranged at the bottom input of the barrel region 125 T, barrel region 125 T is used as the third reaction region, and the light hydrocarbon reacts in barrel region 125 T. Steam input is installed at the bottom of two clapboard region. When implementing, the second catalyst A2 is fed to the bottom of the third reaction region 125 (which is barrel region 125T) through the second catalyst input pipe 128. Light hydrocarbon feedstock Y1 fed to barrel region 125T reacts in the environment of catalyst A2. The equipment structure of other parts is the same with implementation method 1.

Implementation Case

The equipment used in the implementation case is shown in FIG. 1.

The feedstock oil is heavy oil. The processing capacity is 2 million tons/year. The character of the feedstock oil is shown in Table 1. The feedstock oil is pre-heated to 280° C. In the first reaction region, reaction time is 1.2 seconds, reaction temperature is 510° C., catalyst to oil ratio is 6.5, temperature of the regenerated catalyst A1 is 680° C. The amount of atomized steam is 5% of the feedstock oil;

In the second reaction region, reaction temperature is 550° C., reaction time is 3.5 s, catalyst to oil ratio is 7.0, weight hourly space velocity of the catalyst is 8, carbon content of the spent catalyst is 0.6%, and the amount of replenishment steam is 12% of the feedstock oil;

The separation ratio of the catalyst after reaction in the first reaction region is 85%, 15% of it remains in the oil gas. Catalyst A2 is half regenerated catalyst, temperature is 660° C., carbon content is 0.15%;

In the third reaction region, the feedstock is self-produced light gasoline, the temperature is 40° C., the amount of light gasoline is 300000 tons/year, and the reaction temperature is 600° C.;

The diameter of the first reaction region is 1.2 meters and the height of the reaction region is 14 meters;

The diameter of the second reaction region is 3.8 meters and the height is 9 meters; The diameter of the third reaction region is 5 meters and the height is 4 meters, the diameter of the first reaction region output stream conveyor pipe 122 is 1.4 meters; The diameter of the first stripping section 131 is 4.8 meters, the diameter of the second stripping section 14 is 5 meters;

The settler is designed according to the conventional technology, and the general technicians in this field master it.

The reaction conditions and product distribution are shown in Table 2.

Compare Case

Adopting the prior catalytic cracking process, specifically, the equipment used consecutive reactor composes of riser reactor and fluidized bed reactor.

The reaction conditions: the reaction temperature of the first reaction region is 580° C., the reaction temperature of the second reaction region which is the fluidized bed reaction region is 580° C., space velocity of catalyst in the fluidized bed reaction region is 4, superficial velocity of the gas in the fluidized bed reaction region is 1.0 m/s.

The reaction conditions and product distribution are shown in Table 2. C4 mentioned in the present invention is hydrocarbon containing four carbon atoms, which is prior art.

TABLE 1

Character of the feedstock oil

| Project | Data |
|---|---|
| Density, g/cm$^3$ (20° C.) | 0.9035 |
| Residual carbon, w % | 0.62 |
| Hydrogen content, w % | 12.56 |
| Sulfur content, w % | 0.31 |
| Nitrogen content, w % | 0.16 |
| Distillation Range, ° C. | 256~545 |

TABLE 2

Reaction conditions and product distribution comparison of implementation case and compare case

| Project | Implementation case | Compare case |
|---|---|---|
| Temperature of the first reaction region output, ° C. | 510 | 580 |
| Reaction temperature of the second reaction region, ° C. | 550 | 560 |
| Reaction temperature of the third reaction region, ° C. | 600 | |
| Regeneration temperature, ° C. | 680 | 680 |
| Ratio of the steam, % | 17 | 24 |
| Temperature of feedstock oil, ° C. | 280 | 340 |
| Temperature of the half regenerated catalyst, ° C. | 660 | |
| Carbon content of the half regenerated catalyst, % | 0.15 | |
| product distribution, % | | |
| Dry gas (H~C2) | 7.1 | 9.2 |
| Liquefied gas (C3~C4) | 36.8 | 35.33 |
| Gasoline | 28.2 | 28.81 |
| Diesel | 15.1 | 12.19 |
| Heavy oil | 3.6 | 4.28 |
| Coke | 8.8 | 9.73 |
| Loss | 0.4 | 0.46 |
| Propylene | 16.13 | 15.49 |
| Propylene/Dry gas | 2.272465 | 1.683696 |

It can be seen from the comparison results in Table 2 that compared with the conventional catalytic process, the yield of low value products such as dry gas and coke is significantly reduced. High value products such as olefin, liquefied petroleum gas and gasoline yield increased significantly. A yield of dry gas decreases by 2.1 percentage points, the yield of coke decreases by 0.93 percentage points, the yield of propylene increases by 0.64 percentage points, the selectivity of propylene to dry gas increases by 0.589. It can be seen that, in the present invention, the selectivity of propylene increases greatly, and the yield of dry gas and coke decreases greatly.

We claim:

1. A multi-stage fluidized catalytic reaction method of petroleum hydrocarbon, comprising:

arranging a reactor with upper and lower partitions to realize a multi-stage catalytic reaction; wherein the multi-stage catalytic reaction includes primary-stage and secondary-stage catalytic cracking reactions of feedstock oil and primary-stage and secondary-stage catalytic cracking reactions of light hydrocarbons and/or cycle oil, which occur in different reaction regions of the reactor; wherein the reactor is provided with a first reaction section (110), a catalyst splitter (114), a third reaction section (121), a second reaction section (141) and a settler (151) from bottom to top; wherein the first reaction section (110) is a riser reactor, which is provided with a feedstock oil input (113) and upward first reaction region (115); the catalyst splitter (114) is disposed at the output of the first reaction region (115); a second reaction region (145) is arranged in the second reaction section (141), a third reaction region (125) is arranged in the third reaction section (121); a first reaction region output stream conveyor pipe (122) is arranged inside the third reaction section (121), and the output of the first reaction region output stream conveyor pipe (122) is located at the input of the second reaction region (145) which is at the top of the third reaction region (125);

feeding a first catalyst (A1) into the first reaction section (110) under feedstock oil input (113), and then into the first reaction region (115) by pre-lifting medium (G); feeding a catalytic cracking feedstock oil (Y) into the first reaction region (115), carrying out the primary-stage reaction under the catalyst, then carrying out catalyst separation at output of the first reaction region; and entering oil gas upwards into the second reaction region (145) through the first reaction region output stream conveyor pipe (122) for the secondary-stage catalytic cracking reaction of deep cracking; the stream from the second reaction region enters the settler (151) for gas-solid separation;

feeding a second catalyst (A2) into the third reaction region (125) in the third reaction section (121); feeding a light hydrocarbon and/or cycle oil into the third reaction region (125) to carrying out the independent primary-stage reaction under the second catalyst (A2), and then, introducing the catalyst and product from the third reaction region up to the second reaction region (145) to continue the secondary-stage catalytic cracking reaction continuously.

2. The method according to claim 1, wherein:

the first catalyst (A1) is fed into pre-lifting section (112) of the first reaction section (110) through a first catalyst input pipe (118), fluidized by the pre-lifting medium (G) and conveyed to the first reaction region (115), the feedstock oil (Y) is atomized by steam through feedstock oil input (113) into the first reaction region (115) in the first reaction section (110), which is atomized and mixes and contacts with the first catalyst (A1), and then the primary-stage catalytic cracking reaction takes place; after the primary-stage catalytic cracking reaction, part of the catalyst is separated from catalyst splitter (114); separated catalyst flows out of the reactor through spent catalyst conveyor pipe after stripped in a first stripping section (131); oil gas is fed up to the second reaction region (145) through a first reaction region output stream conveyor pipe (134) for the secondary-stage catalytic cracking reaction;

the second catalyst (A2) is fed into the third reaction region (125) in the third reaction section (121) which is installed between the first stripping section (131) and the second reaction section (141) through a second catalyst input pipe (128); the light hydrocarbon and/or cycle oil is fed into the third reaction region (125); independent primary-stage catalytic cracking reaction takes place in the surrounding of the second catalyst (A2), and then, catalyst and products (P3) of the third reaction region is fed up to the second reaction region (145), to continue the secondary-stage catalytic cracking reaction; in the third reaction region (125), catalyst is fluidized with steam, so that turbulent fluidized bed or circulating fluidized bed is formed in this area, and the steam enters the second reaction region (145) at the same time;

the product gas and catalyst after reaction in the second reaction region are conveyed to the settler (151) for gas-solid separation, and reaction product (P) flows out of the settle;

the catalyst after reaction in the second reaction region is fed to a first catalyst stripping region (133) installed in the first stripping section (131) from a catalyst reflux pipe (148) of the second reaction region, and stripped together with the catalyst separated from the first reaction region (115) through the catalyst splitter (114), and flows out of the reactor from the spent catalyst conveyor pipe (134) after stripping; or a second stripping section (143) is installed out of the second reaction region; a second spent catalyst (B2) flows out of the reactor through a catalyst output pipe (144) after stripping.

3. The method according to claim 1, wherein when there are multiple feedstock in the third reaction region (125), the feedstock is fed into the third reaction region (125) hierarchically according to the boiling point or final boiling point; components with low boiling point or final boiling point is fed into the third reaction region (125) in the lower layer, and the components with higher boiling point or final boiling point is fed into the third reaction region (125) in higher layer successively; when light hydrocarbon and light cycle oil react in the third reaction region (125) at the same time, the light hydrocarbon is fed into the reaction region below the third reaction region, and the light cycle oil is fed into the third reaction region (125) above the light hydrocarbon.

4. The method according to claim 1, wherein the first reaction region (115) adopts riser reactor, which is conveyor bed, the third reaction region (125) adopts turbulent fluidized bed or circulating fluidized bed, the second reaction region (145) adopts circulating fluidized bed or turbulent fluidized bed; optionally, the superficial velocity of the turbulent fluidized bed said is lower than 1.2 m/s, and the superficial velocity of circulating fluidized bed said is 1.2 to 4.0 m/s.

5. The method according to claim 1, wherein the third reaction section (121) mentioned is divided vertically into several independent sections which are clapboard region (125Y) and/or barrel region (125T) by vertical clapboards (126) and/or vertical barrels (127); the catalyst fed into the third reaction section (121) enters each region through the connected channel in the bottom of the clapboard region (125Y) and/or barrel region (125T); all or part of the said clapboard region (125Y) and/or barrel region (125T) is used as the third reaction region; the light hydrocarbon and/or cycle oil reacts in one or several or all of the said clapboard region (125Y) and/or barrel region (125T); when there are several kinds of feedstock in the third reaction region, different feedstock reacts in disparate clapboard region (125Y) and/or barrel region (125T) with respective reaction condition.

6. The method according to claim 1, wherein the amount of the feedstock fed into the third reaction region (125) which is the amount of the light hydrocarbon and/or cycle oil, is controlled by the carbon content of catalyst after reaction in the second reaction region; it could control the carbon content of catalyst after reaction in the second reaction region less than 0.8% weight ratio.

7. The method according to claim 1, wherein the amount of the feedstock fed into the third reaction region (125) which is the amount of the light hydrocarbon and/or cycle oil, is controlled by the carbon content of catalyst after reaction in the third reaction region; it could control the carbon content of catalyst after reaction in the third reaction region less than 0.4% weight ratio.

8. The method according to claim 1, wherein the reaction temperature of the second reaction region (145) is higher than or the same with the first reaction region (115); the reaction temperature of the second reaction region is higher than the first reaction region by 0° C. to 70° C., the reaction temperature of the second reaction region (145) is controlled by the amount of the second catalyst (A2).

9. The method according to claim 1, wherein a fourth reaction region (155) is installed between the second reaction region (145) and the shell of the second reaction section (141), which is used for the reaction of light hydrocarbon or cycle oil.

10. A multi-stage fluidized catalytic reactor of petroleum hydrocarbon, characterized in that, the reactor includes a first reaction section (110), a catalyst splitter (114), a third reaction section (121), a second reaction section (141) and a settler (151) from bottom to top;

the first reaction section (110) is a riser reactor, including a first catalyst input pipe (118), a pre-lifting section (112), a feedstock input (113), a first reaction region (115) from bottom to top, which is used for the reaction of feedstock oil (Y); a first stripping section (131) is installed around the feedstock oil reaction region, which is the first reaction region (115), the catalyst splitter (114) is installed at the output of the first reaction region (115), which is also at the top of a first catalyst stripping region (133) in the first stripping section (131);

there is a clapboard (116) installed between the first catalyst stripping region (133) and the third reaction section (121), and a first reaction region output stream conveyor pipe (122) is installed on the clapboard (116); a second reaction region (145) is installed in the second reaction section (141), a third reaction region (125) is installed inside the third reaction section (121), the output of first reaction region output stream conveyor pipe (122) is at the input of the second reaction region (145) which is at the top of the third reaction region (125), there are a light hydrocarbon or cycle oil input (124) and a second catalyst input pipe (128) installed in the third reaction section (121), which is used for the reaction of light hydrocarbon and cycle oil;

a second clapboard (149) is installed between the third reaction section (121) and the outside of the second reaction region (145) which is in the second reaction section (141); a conveyor pipe (146) is installed between the second reaction region (145) and the gas-solid separator in the settler (151).

11. The reactor according to claim 10, wherein the first reaction section (110), catalyst splitter (114), the first stripping section (131), the third reaction section (121), the second reaction section (141), and settler (151) are installed coaxially up and down.

12. The reactor according to claim 10, wherein a porous plate (147) is installed between the third reaction section (121) and the second reaction region (145); stream from the first reaction region and catalyst and gas from the third reaction region is distributed to the second reaction region (145) through the porous plate (147).

13. The reactor according to claim 10, wherein a catalyst reflux pipe (148) is installed between the second reaction section (141) and the first stripping section (131); or a catalyst reflux pipe (148) is installed between the second reaction section (141) and the first stripping section (131), and a second stripping section (143) is arranged outside the second reaction region (145).

14. The reactor according to claim 10, wherein a fourth reaction region (155) is installed between the second reaction region (145) and the shell of the second reaction section (141), which is used for the reaction of cycle oil or recycle oil.

15. The reactor according to claim 10, wherein the district between the shell of the third reaction section (121) and the first reaction region output stream conveyor pipe (122) is divided into several isolated regions which are clapboard region (125Y) and/or barrel region (125T) by vertical clapboards (126) and/or vertical barrels (127), the vertical clapboards (126) or vertical barrels (127) are interconnected at the bottom; input of light hydrocarbon and steam is installed in the bottom of part or all of the clapboard region (125Y) and/or barrel region (125T).

16. The reactor according to claim 15, wherein the clapboards and barrels could be connected or supported to the shell of the third reaction section.

* * * * *